Jan. 26, 1937.  H. C. A. BEHR ET AL  2,069,193
AUTOMATIC ROASTER
Filed June 20, 1936  2 Sheets-Sheet 2

Inventors
HARRY C. A. BEHR
AND JULES J. ECK

By E. E. Vrooman & Co.,
Attorneys

Patented Jan. 26, 1937

2,069,193

UNITED STATES PATENT OFFICE 2,069,193

AUTOMATIC ROASTER

Harry C. A. Behr and Jules J. Eck, York, Pa., assignors to Yorktown Electric Roaster Manufacturing Corporation, York, Pa., a corporation of Pennsylvania Application June 20, 1936, Serial No. 86,406

13 Claims. (Cl. 34—9)

This invention relates to an automatic roaster for roasting different foods, such as coffee and the like.

An object of this invention is the construction of a simple and efficient roaster of an upright or vertical type.

Another object of the invention is the construction of an efficient roaster which can be easily installed in a store or building for handling automatically preferably small quantities of coffee, as the operator desires.

A further object is the construction of a coffee roaster which will operate automatically after receiving the beans, for efficiently roasting same and then automatically discharging the roasted coffee in predetermined quantities.

A still further object of the invention is the construction of a relatively compact roaster which is particularly adapted for efficiently handling coffee in stores to be roasted, whereby a customer can be quickly and efficiently supplied with strictly fresh-roasted coffee in a minimum amount of time.

Another object of the invention is the construction of a simple and efficient roaster that employs a blower for agitating or stirring the beans while being roasted.

With the foregoing and other objects in view, our invention comprises certain novel constructions, combinations and arrangements of parts as will be hereinafter fully described, illustrated in the accompanying drawings and more particularly pointed out in the appended claims.

Figure 1:
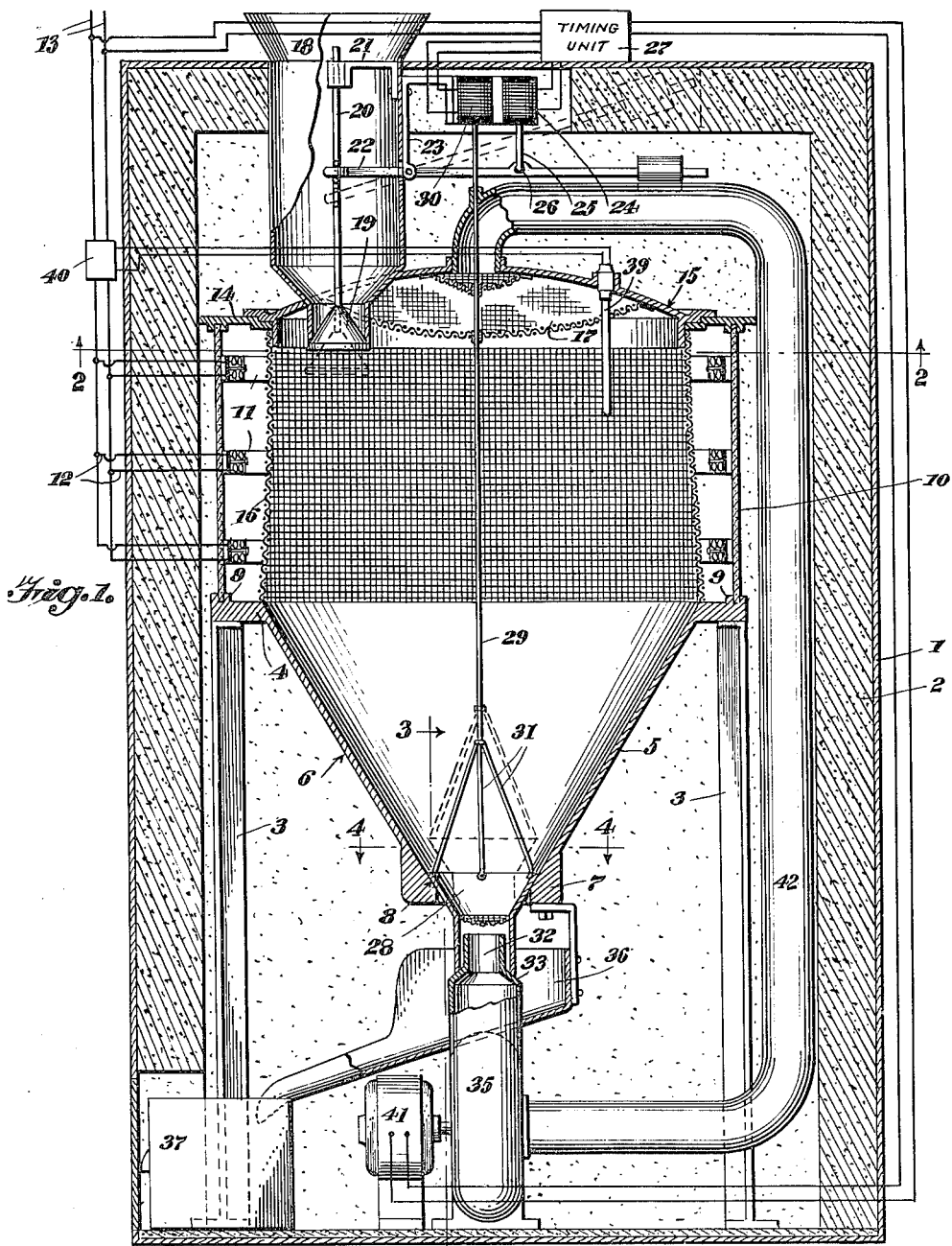
Figure 1 is a vertical, central sectional view of an automatic roaster constructed in accordance with this invention, a few parts being shown in side elevation.
Figure 2:
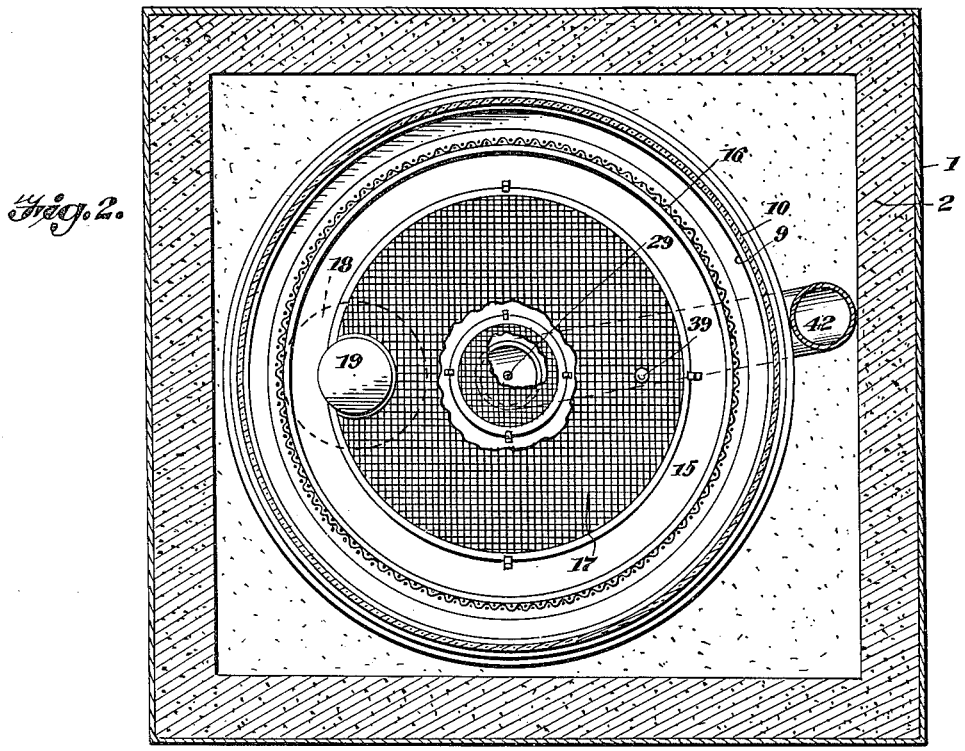
Figure 2 is a horizontal sectional view taken on line 2—2, Figure 1, and looking in the direction of the arrows.

Referring to the drawings, in which we have shown the preferred embodiment of our invention, 1 designates a suitable casing or cabinet in which our roasting mechanism is placed. The cabinet 1 is provided on its interior with a suitable insulation 2, which prevents the cabinet 1 from being heated by the heating means hereinafter described.

Figure 3:
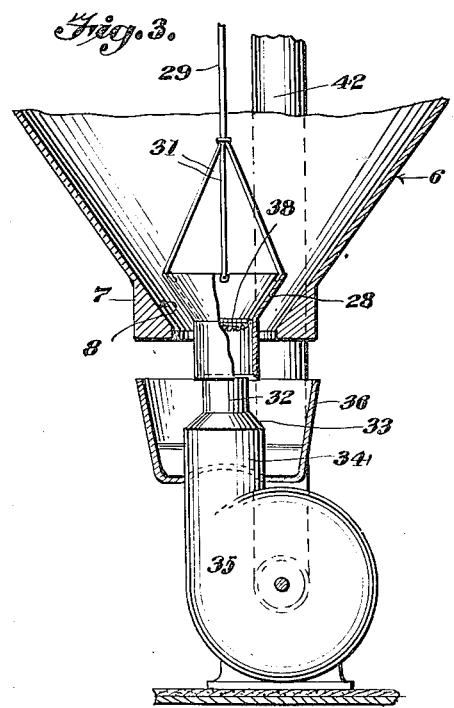
Figure 3 is a sectional view taken on line 3—3, Figure 1, and looking in the direction of the arrows.
Figure 4:
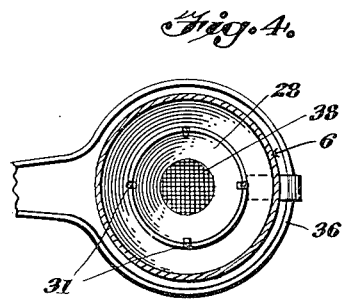
Figure 4 is a horizontal sectional view taken on line 4—4, Figure 1, and looking in the direction of the arrows.

A suitable number of legs 3 are in the cabinet 1, resting upon the bottom insulation, and these legs 3 support the horizontal rim 4 that is an integral part of the hopper-like bottom 5 of the container 6. The hopper-like bottom 5 is provided at its lower end with an enlarged sleeve-like portion 7; said sleeve-like portion 7 is provided with a valve seat 8 (Fig. 3). The horizontal rim 4 is provided with preferably an annular socket 9 into which fits the lower end of shell 10. This shell 10, is non-conductive of heat as it is preferably made of a specially processed asbestos substance, whereby it is also a good insulator, on which is suitably secured a plurality of ring-like electrical heating units 11. These heating units 11 are electrically connected by wires 12 to feed wires 13 (Fig. 1) which feed wires are connected to a master switch (not shown) whereby the operator can start or stop the operation of the entire roaster.

On the upper end of non-conducting shell 10 is positioned a horizontal rim 14; the shell extending into a socket similar to socket 9, as will be clearly seen upon referring to Figure 1. A cover 15 is detachably mounted on rim 14. A shell-like screen 16 is within shell 10 with the heating units 11 between said screen and said shell, whereby the beans do not come in contact with the heating units. The screen 16 converges from its lower end to its upper end, whereby the roasting beans are maintained better in a whirlpool-like action during their roasting period. A concavo-convex screen 17 is secured within the container with its edges suitably fastened to the inner face of cover 15. This screen 17 facilitates the roasting action of the beans within the container.

A suitable hopper 18 is placed upon the cabinet 1 and extends through the cover 15, for supplying the beans to the container. This inlet hopper 18 is provided with a valve 19, normally closing its lower end, and extending upwardly from valve 19 is a valve rod 20 which slides within bracket 21. A lever 22 is pivotally supported upon bracket 23; said lever 22 has its inner end around valve rod 20, whereby the lever can raise and lower valve 19. A solenoid 24 is provided to actuate lever 22. Through the medium of a unit 25 the solenoid is connected at 26 to lever 22 so that when the solenoid is energized it will draw upward on lever 22 to open valve 19 and allow the coffee beans therein to be automatically discharged into the container. Solenoid 24 is electrically connected to the timing unit 27.

Normally engaging valve seat 8 is a funnel-like valve 28. A primary rod 29 extends from solenoid 30 downwardly through a portion of the container 6, and this rod 29 has branching or auxiliary rods 31, at its lower end, which rods 31 are suitably connected at their lower ends to valve 28. The lower end of the funnel-like valve 28 fits over the nozzle 32 that extends from the reduced portion 33 of the discharge end 34 of the blower 35. When valve 28 is seated on valve seat 8 the lower end of said valve will close snugly against reduced portion 33. Around the discharge end 34 of blower 35 is a chute 36, which chute has its discharge end suitably positioned in the receiving receptacle 37, whereby when the valve 28 is raised the roasted beans in the container will be discharged into the receiving receptacle 37. The valve 28 is provided with a screen 38 which prevents the beans in the container falling into blower 35. Solenoid 30 is electrically connected to the timing unit 27, whereby when the coffee beans are suitably roasted the solenoid 30 will operate valve 28 to permit the roasted beans to be discharged into receptacle 37. Upon the roasted beans being discharged, the solenoid 30 will permit valve 28 to be seated, closing the discharge end of the container 6, whereupon solenoid 24 will automatically operate to actuate valve 19, of inlet hopper 18, to allow a new supply of unroasted beans to be discharged into the container 6.

A thermostat 39 is positioned on cover 15 and extends into the container. This thermostat is electrically connected to the thermostat or temperature control 40, which control 40 is also electrically connected to the wires 13.

Motor 41 operates blower 35. This motor 41 is electrically connected, in circuit with wires 13, whereby when the master switch is closed by the operator of the roaster, the motor will operate to cause blower 35 to force air under pressure into the container 6 for agitating or stirring the beans being roasted. Therefore, the beans are kept in perfect agitation, insuring of uniform roasting.

A conduit or pipe 42 is connected at its upper end to cover 15 and at its lower end to the side of blower 35. This "return" pipe 42 permits air to be drawn from the container through the blower 35 and thence discharged again into the container 6. This method of circulating the air results in a great saving, during the roasting process, because the shrinkage of the beans is not near so great as heretofore, since moisture in the beans is not greatly affected, whereby the original weight of the beans is greatly retained.

When it is desired to roast coffee with our apparatus, the supply is deposited in hopper 18, then the master switch is operated to close the circuit, whereupon the timing device will operate permitting the green beans to be discharged into the container. Simultaneously with the closing of the master switch motor 41 will begin to operate, as well as the heating units 11. Thus the roasting of the coffee will automatically start, and when the roasting is finished, through the timing unit the discharge valve 28 will be operated, thereby allowing the roasted beans to be discharged into receptacle 37.

While we have described the preferred embodiment of our invention and illustrated the same in the accompanying drawings, minor changes or alterations may appear to one skilled in the art to which this invention relates during the extensive manufacture of the same, and we, therefore, reserve the right to make such changes or alterations as shall fairly fall within the scope of the appended claims.

What we claim is:

1. In a roaster, the combination of a container provided at its lower end with an outlet, a blower under said outlet and provided with a discharge end disconnected from said outlet, said discharge end terminating in a discharge nozzle contiguous to and spaced from said outlet, a bodily movable valve mounted in said container and normally closing said outlet and provided with a hollow portion surrounding said nozzle and being adapted to rest at one end snugly upon the discharge end of said blower, said valve provided with an air passage whereby air can flow from said blower into said container, and means for operating said valve.

2. In a roaster, the combination of a container provided with a hopper-like bottom, said bottom provided with an enlarged sleeve-like portion at its lower end, said sleeve-like portion provided with a valve seat, a blower under said sleeve-like portion, said blower provided with a discharge end having a reduced portion, said reduced portion terminating in an upstanding nozzle contiguous to said valve seat, a funnel-like valve in said hopper-like bottom and normally seated upon said valve seat, said funnel-like valve having its lower end around said nozzle and normally resting snugly upon said reduced portion, and means for operating said funnel-like valve.

3. In a roaster, the combination of a hopper-like bottom provided with a discharge outlet, said hopper-like bottom provided at its upper end with an outwardly-extending horizontal rim, a non-conducting shell seated on said outwardly-extending horizontal rim, a screen supported entirely by said rim within said shell, a rim resting on the upper end of said non-conducting shell, a cover resting on said last-mentioned rim, valved inlet means on said cover, and valve means cooperating with said outlet for normally closing same.

4. In a roaster, the combination of a hopper-like bottom provided with a discharge outlet, said hopper-like bottom provided at its upper end with an integral horizontal rim, said rim provided with a receiving socket, a non-conducting shell seated at its lower end in said socket, a rim at the upper end of said shell and having said shell seated therein, an inclosing screen resting at its lower end upon said first-mentioned rim and engaging at its upper end said last-mentioned rim, a cover seated upon said last-mentioned rim, heating units mounted on the inner face of said non-conducting shell behind said inclosing screen, valve means normally closing the discharge outlet of said hopper-like bottom, and means on said cover for controlling the supply of beans or the like to said inclosing screen and said hopper-like bottom.

5. In a roaster, the combination of a container and a blower, said container and blower being spaced apart, bodily movable valve means mounted upon said container and forming a closed communication between said container and registering with said blower when said valve is in a closed position, and a conduit connected to a portion of said container and to a portion of said blower, whereby a continuous circulation of air is created when the mechanism is operating.

6. In a roaster, the combination of a container provided with a discharge outlet, means for forcing air under pressure through said discharge outlet, valve means provided with a screen over said air forcing means, said forced air passing through said screen of the valve means, and means for operating said valve means.

7. In an automatic roaster, the combination of a container, a hopper in communication at its inner end with the interior of said container, a bracket carried by said hopper, a valve stem working in said bracket and provided at its inner end with a valve normally closing the inner end of said hopper, a lever extending into said hopper and movably connected to said valve stem, and a solenoid movably connected to said lever.

8. In an automatic roaster, the combination of a container, a hopper above said container and having its lower end opening into said container, a horizontal bracket within said hopper and fastened to its side, a valve stem provided with a valve at its lower end within said hopper and having its upper end slidably mounted in said bracket, a horizontal lever extending through the side of said hopper and pivotally connected to said valve stem between said bracket and valve, and a solenoid movably connected to said lever.

9. In an automatic roaster, the combination of a container provided with a discharge outlet, a hollow bodily-movable valve closing said discharge outlet, said hollow valve provided with a screen extending across same, and means for supplying air under pressure to said container through the screen of said valve.

10. In an automatic roaster, the combination of a container provided with a discharge outlet, a valve provided with a screened conduit normally closing said discharge outlet, and means for supplying air under pressure to said container only through the screened conduit of said valve.

11. In an automatic roaster, the combination of a container provided with a discharge outlet, a blower entirely disconnected from said container and its discharge outlet and being capable of discharging into said discharge outlet, and a movable funnel-like valve normally closing said discharge outlet and having one end normally resting on said blower.

12. In an automatic roaster, the combination of a container provided with an opening, a blower entirely disconnected from said container and being capable of discharging through said opening into said container, and a movable screened valve with portions registering with said container and blower and forming communication therebetween.

13. In an automatic roaster, the combination of a container provided with a discharge outlet, a blower entirely spaced from and discharging into said discharging outlet, a bodily-movable valve provided with an air passage therein and normally closing said discharge outlet and resting at its outer end upon said blower, thereby forming the sole communication for said container and blower, and a screen in said valve across its air passage.

HARRY C. A. BEHR.
JULES J. ECK.